UNITED STATES PATENT OFFICE.

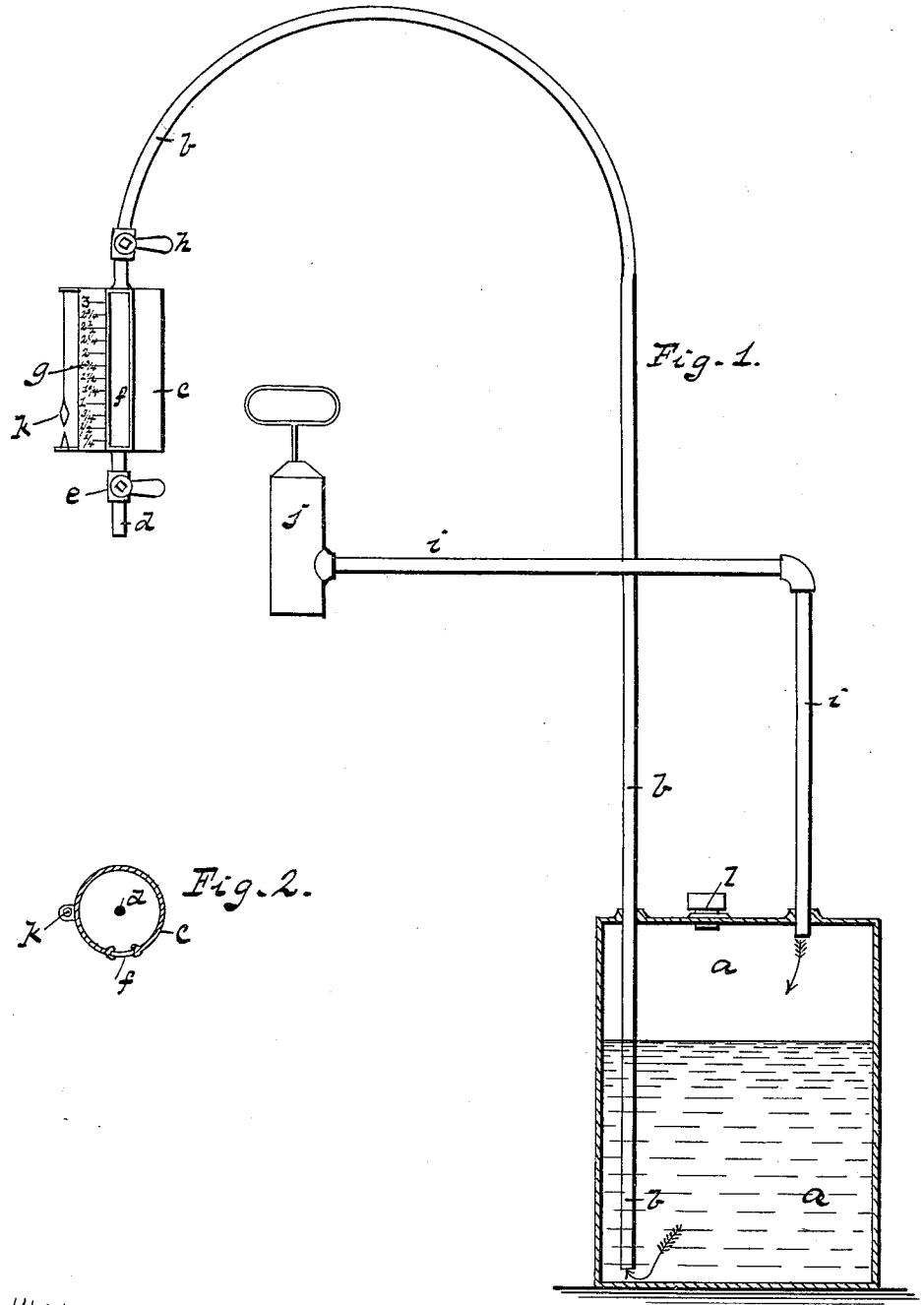

BERNHARD DROEGER, OF ALLEGHENY, PENNSYLVANIA.

MEASURING APPARATUS FOR OIL.

SPECIFICATION forming part of Letters Patent No. 372,606, dated November 1, 1887.

Application filed January 22, 1887. Serial No. 225,193. (No model.)

*To all whom it may concern:*

Be it known that I, BERNHARD DROEGER, a citizen of Germany, residing at Allegheny, in the county of Allegheny and State of Pennsylvania, have invented certain new and useful Improvements in Apparatus for Measuring Oil and other Liquors; and I do hereby declare the following to be a full, clear, and exact description of the invention, such as will enable others skilled in the art to which it pertains to make and use the same, reference being had to the accompanying drawings, which form a part of this specification.

My invention relates to an improvement in apparatus for measuring oil, the object being to provide a means for accurately measuring oil or other explosive or combustible liquors, and thereby avoid accidents by fire; and with this end in view my invention consists in certain details of construction and combination of parts, as will be fully described hereinafter.

In the accompanying drawings, Figure 1 is a side elevation of my improved apparatus constructed in accordance with my invention. Fig. 2 is a sectional plan view of the measure.

To put my invention into practice I provide a large air-tight tank or receptacle, $a$, and place the same in a cellar or other place of safety. From this tank $a$, I conduct a pipe, $b$, to the floor above any required distance to a point or place of delivery. To this delivery end of the pipe $b$, I secure a small vessel, $c$, having an outlet, $d$, provided with a cock or valve, $e$, by which the oil may be drawn out or retained in the vessel $c$. At the front of this vessel $c$, and extending the entire length of the same, is a piece of glass, $f$, by which the contents of the vessel $c$ may be seen. At one side of this glass $f$, I place a gage, $g$, consisting of parallel marks indicating quarts and fractions of the same. Above the vessel $c$, I place a valve, $h$, by which the flow of liquor may be regulated and controlled. From the large tank $a$, I conduct another pipe, $i$, having attached thereto an air-pump, $j$, placed near or convenient to the point of delivery. At one side of the small vessel $c$, I place an ordinary plumb-bob, $k$, by which means the vessel $c$ may be adjusted to a vertical position, and thereby give an accurate and true measure.

In operation oil is placed in large quantities in the large tank $a$ through an opening, $l$, at the top. This opening is now closed. Air is forced into the tank $a$ by means of the pump $j$ until the pressure is sufficient to elevate a quantity of the liquor in the pipe $b$. The valve or cock $h$ is now opened and the liquor allowed to fill the vessel $c$ to any required mark on the gage $g$, which indicates the quantity in quarts or fractions thereof.

Having thus described my invention, what I claim, and desire to secure by Letters Patent, is—

In an apparatus such as described, the combination consisting of the large tank $a$, connected to a smaller vessel, $c$, by a pipe, $b$, and provided with a valve or cock, $h$, the outlet of the vessel having a valve or spigot, $e$, for regulating and controlling a fluid traveling through the same, the gage $g$, and glass front $f$, and an air-pump, $j$, connected by a suitable pipe, $i$, to the large tank $a$, substantially as described.

BERNHARD DROEGER.

Witnesses:
 GUST. DROEGER,
 H. T. MORRIS.